(12) United States Patent
Sekiya

(10) Patent No.: US 10,113,839 B2
(45) Date of Patent: Oct. 30, 2018

(54) SMALL UNMANNED AIR VEHICLE REPULSING APPARATUS

(71) Applicant: DISCO CORPORATION, Tokyo (JP)

(72) Inventor: Kazuma Sekiya, Tokyo (JP)

(73) Assignee: Disco Corporation, Tokyo (JP)

( * ) Notice: Subject to any disclaimer, the term of this patent is extended or adjusted under 35 U.S.C. 154(b) by 177 days.

(21) Appl. No.: 15/190,984

(22) Filed: Jun. 23, 2016

(65) Prior Publication Data

US 2016/0376029 A1   Dec. 29, 2016

(30) Foreign Application Priority Data

Jun. 25, 2015  (JP) .................................. 2015-127664

(51) Int. Cl.
| | |
|---|---|
| *F41H 13/00* | (2006.01) |
| *B64F 1/02* | (2006.01) |
| *B64D 17/80* | (2006.01) |
| *F41H 11/02* | (2006.01) |
| *F42B 12/68* | (2006.01) |
| *F41B 5/14* | (2006.01) |
| *F41B 7/04* | (2006.01) |

(52) U.S. Cl.
CPC .......... *F41H 13/0006* (2013.01); *B64D 17/80* (2013.01); *B64F 1/02* (2013.01); *F41B 5/1484* (2013.01); *F41B 5/1488* (2013.01); *F41H 11/02* (2013.01); *F42B 12/68* (2013.01); *B64C 2201/182* (2013.01); *F41B 7/046* (2013.01)

(58) Field of Classification Search
CPC ...... F41H 11/02; F41H 13/0006; F42B 12/68; B64C 2201/182; B64F 1/02
See application file for complete search history.

(56) References Cited

U.S. PATENT DOCUMENTS

| | | | | |
|---|---|---|---|---|
| 2,722,075 | A * | 11/1955 | Abrassart | A01M 31/00 43/1 |
| 2,848,834 | A * | 8/1958 | Cox | F41H 13/0006 43/1 |
| 3,972,386 | A * | 8/1976 | Hayslip | A62B 1/18 182/50 |
| 6,394,016 | B2 * | 5/2002 | Swartout | B63B 21/56 114/254 |
| 7,328,644 | B2 * | 2/2008 | Vickroy | F41H 11/02 102/405 |
| 8,100,359 | B2 * | 1/2012 | Al-Qaffas | F41F 1/06 244/1 TD |
| 8,205,537 | B1 * | 6/2012 | Dupont | F41H 13/0006 102/504 |
| 8,387,540 | B2 * | 3/2013 | Merems | F41H 11/02 102/501 |

(Continued)

FOREIGN PATENT DOCUMENTS

JP      2002-355323      12/2002

*Primary Examiner* — Joseph W Sanderson
(74) *Attorney, Agent, or Firm* — Greer Burns & Crain Ltd.

(57) ABSTRACT

A small unmanned air vehicle repulsing apparatus includes a capturing body adapted to capture a drone, a target to be captured; and a capturing body launching apparatus adapted to launch the capturing body at the drone, in which the capturing body launching apparatus can quickly capture the drone by launching the capturing body even if the suspicious drone flies into an area to be protected so as to protect the interest and safety of law-abiding people.

1 Claim, 4 Drawing Sheets

(56) References Cited

U.S. PATENT DOCUMENTS

| | | | | |
|---|---|---|---|---|
| 2007/0169616 A1* | 7/2007 | Vickroy | F41H 11/02 | 89/1.11 |
| 2007/0261542 A1* | 11/2007 | Chang | F41H 11/02 | 89/1.11 |
| 2010/0243799 A1* | 9/2010 | Al-Qaffas | F41F 1/06 | 244/110 C |
| 2012/0011996 A1* | 1/2012 | Glasson | F41H 11/04 | 89/36.17 |
| 2012/0210904 A1* | 8/2012 | Merems | F41H 11/02 | 102/504 |
| 2014/0216290 A1* | 8/2014 | Yee | F41H 11/02 | 102/374 |
| 2014/0331984 A1* | 11/2014 | Brahler, II | F41B 11/723 | 124/76 |
| 2015/0316345 A1* | 11/2015 | Brahler, II | F41B 11/72 | 124/73 |
| 2016/0363422 A1* | 12/2016 | Young | F41H 11/04 | |
| 2017/0261292 A1* | 9/2017 | Armstrong | F42B 12/56 | |
| 2018/0162530 A1* | 6/2018 | Klein | B64C 39/024 | |

* cited by examiner

SMALL UNMANNED AIR VEHICLE REPULSING APPARATUS

BACKGROUND OF THE INVENTION

Field of the Invention

The present invention relates to a repulsing apparatus for repulsing a small unmanned air vehicle that flies into public areas.

Description of the Related Art

Recent years have seen development of small unmanned air vehicles called drones, facilitating, for example, aerial photo and video shooting, logistics, and so on. Commercially available at relatively low prices, drones are readily affordable even for ordinary consumers. Such drones offer promise for application to a wide range of fields.

Nowadays, however, malicious deeds such as flying a drone carrying a radioactive substance onto the prime minister's official residence and shooting aerial video during the Gokaicho event's Buddhist ceremony at a Buddhist temple (e.g., Zenkoji temple in Nagano Prefecture) have become rampant. Moreover, dangerous deeds such as dropping a drone in such public areas have occurred frequently. In particular, deeds such as flying a drone over a public area for aerial shooting not only interfere with the interest of law-abiding people but also expose these people to danger, and leaving these deeds unresolved should not be tolerated. For example, Japanese Patent Laid-Open No. 2002-355323 proposes a capturing apparatus for capturing a target. However, it would be difficult to capture a drone using this capturing apparatus.

SUMMARY OF THE INVENTION

In light of the foregoing, it is an object of the present invention to provide a small unmanned air vehicle repulsing apparatus for repulsing (capturing) a small unmanned air vehicle quickly if such a small unmanned air vehicle flies into an area to be protected.

In accordance with an aspect of the present invention, there is provided a small unmanned air vehicle repulsing apparatus for repulsing a small unmanned air vehicle. The small unmanned air vehicle repulsing apparatus includes a capturing body and a capturing body launching apparatus. The capturing body captures the small unmanned air vehicle. The capturing body launching apparatus launches the capturing body at the small unmanned air vehicle.

Preferably, the small unmanned air vehicle repulsing apparatus according to the present invention further includes detection means that detects a distance and a direction to the small unmanned air vehicle. Preferably, the present invention includes determination means that determines, on the basis of information from the detection means, whether or not the small unmanned air vehicle is within a firing range. When the determination means determines that the small unmanned air vehicle is within the firing range, the capturing body launching apparatus launches the capturing body at the small unmanned air vehicle.

Preferably, the capturing body includes a capturing bullet, a wire, and an electric reel. The capturing bullet captures the small unmanned air vehicle. The wire is coupled to the capturing body. The electric reel takes up the wire. Preferably, the capturing bullet includes a net and a parachute. The net entangles the small unmanned air vehicle. The parachute reduces a falling speed of the small unmanned air vehicle.

The small unmanned air vehicle repulsing apparatus according to the present invention includes the capturing body and the capturing body launching apparatus. The capturing body captures the small unmanned air vehicle. The capturing body launching apparatus launches the capturing body at the small unmanned air vehicle. As a result, the capturing body launching apparatus can quickly capture the small unmanned air vehicle by launching the capturing body even if such a suspicious small unmanned air vehicle flies into the area to be protected, thus protecting the interest and safety of law-abiding people.

If the small unmanned air vehicle repulsing apparatus according to the present invention includes the detection means that detects the distance and the direction to the small unmanned air vehicle, the same apparatus can identify a position of the small unmanned air vehicle that has flown into the area to be protected. Further, if the small unmanned air vehicle repulsing apparatus according to the present invention includes the determination means that determines, on the basis of information from the detection means, whether or not the small unmanned air vehicle is within the firing range, and when it is determined by the determination means that the small unmanned air vehicle is within the firing range, the capturing body launching apparatus launches the capturing body at the small unmanned air vehicle, thus making it possible to positively capture the small unmanned air vehicle.

The capturing body includes the capturing bullet, the wire, and the electric reel. The capturing bullet captures the small unmanned air vehicle. The wire is coupled to the capturing body. The electric reel takes up the wire. As a result, after the small unmanned air vehicle is captured with the capturing bullet, it is possible to draw the small unmanned air vehicle close to the small unmanned air vehicle repulsing apparatus by taking up the wire on the electric reel.

The capturing bullet includes the net and the parachute. The net entangles the small unmanned air vehicle. The parachute reduces the falling speed of the small unmanned air vehicle. As a result, after the small unmanned air vehicle is captured with the net, it is possible to prevent the small unmanned air vehicle from falling and colliding with the ground by opening the parachute.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
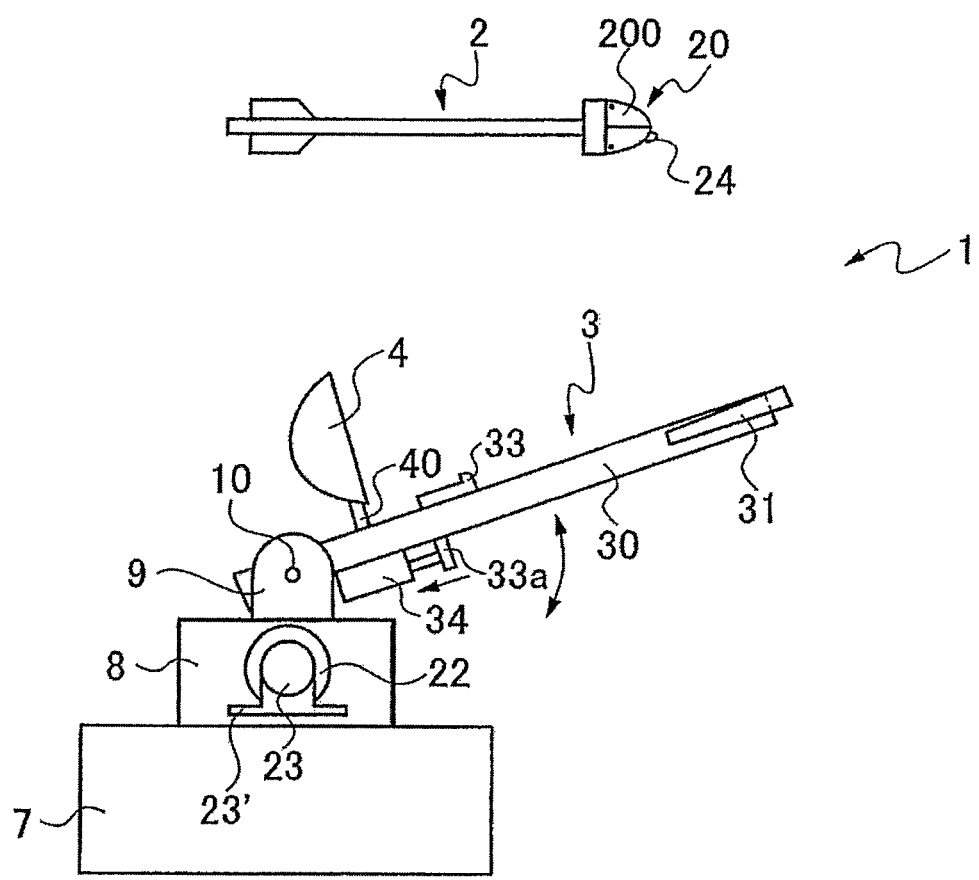
FIG. 1 is a side view illustrating a configuration example of a small unmanned air vehicle repulsing apparatus.

A small unmanned air vehicle repulsing apparatus 1 illustrated in FIG. 1 includes a capturing body 2 and a capturing body launching apparatus 3. The capturing body 2 captures a small unmanned air vehicle (hereinafter referred to as a "drone"), a target to be captured. The capturing body launching apparatus 3 launches the capturing body at the drone.

Figure 2:
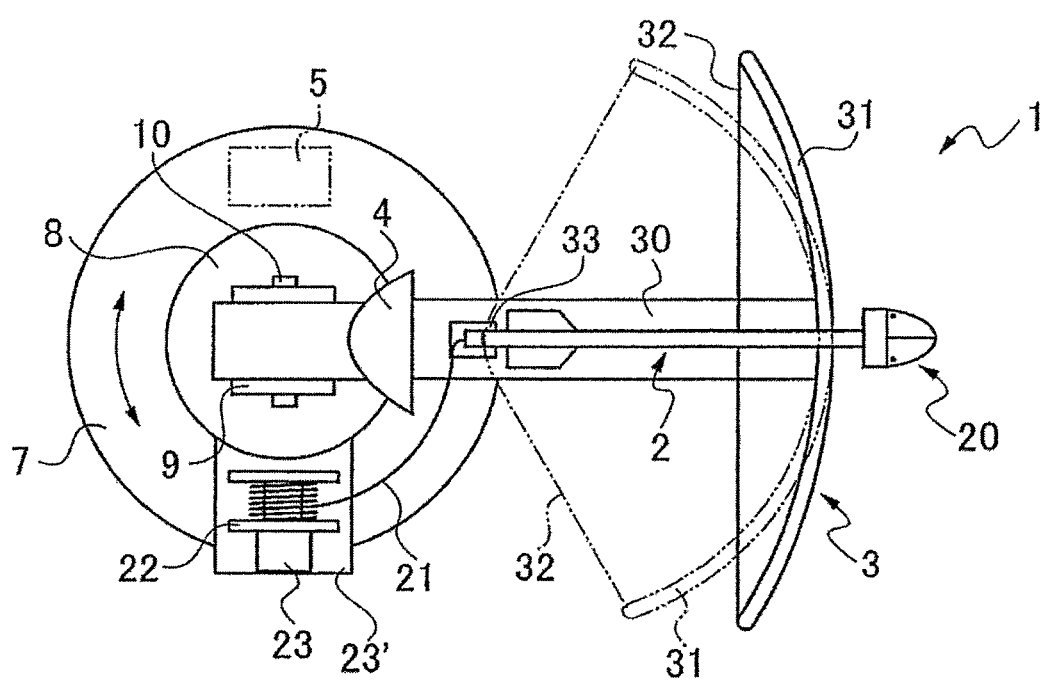
FIG. 2 is a plan view illustrating a configuration of the small unmanned air vehicle repulsing apparatus with a capturing body fitted to a capturing body launching apparatus.

As illustrated in FIGS. 1 and 2, the capturing body launching apparatus 3 is configured like a bow gun and includes a launch pad 30, a bow 31, a bowstring 32, and a hooking section 33. The capturing body 2 is fitted to the launch pad 30 and launched therefrom. The bow 31 is attached to a tip of the launch pad 30. The bowstring 32 is strung between two ends of the bow 31. The bowstring 32 is hooked on the hooking section 33. An end portion 33a of the hooking section 33 is coupled to a piston of an air cylinder 34 fastened to a lower surface of the launch pad 30. When the piston of the air cylinder 34 pulls the end portion 33a backward and releases the hooking section 33 with the bowstring 32 pulled backward and hooked on the hooking section 33, the bowstring 32 is moved forward fast by a restoring force of the bow 31.

The capturing body launching apparatus 3 illustrated in FIG. 1 is arranged on a mounting table 7, with a rotatable rotating table 8 arranged on an upper surface of the mounting table 7. Rotation of the rotating table 8 allows the capturing body launching apparatus 3 to rotate. A support section 9 is arranged on the rotating table 8 to support a rear side of the launch pad 30. It is possible to swing a front side of the launch pad 30 vertically and adjust a sight of the capturing body 2 by rotating the rear side of the launch pad 30 about a fulcrum shaft 10 with the capturing body 2 fitted to the launch pad 30. The capturing body launching apparatus 3 is not limited to the configuration in the present embodiment and may be configured in the form of an air gun, a slingshot, gas gun, and so on.

The small unmanned air vehicle repulsing apparatus 1 includes detection means 4 that detects a distance and a direction to a drone that flies into an area to be protected. The detection means 4 is fastened to the launch pad 30 by a fastening section 40. The detection means 4 includes, for example, a radar and has a parabola antenna. The detection means 4 rotates together with the rotating table 8 and radiates radio waves into the air and also receives reflected waves reflected by the drone, thus detecting the distance and direction to the drone. The detection means 4 may be able to identify the direction and distance to the drone by performing image processing on the basis of phase information included in the received reflected waves. Alternatively, the detection means 4 may use, for example, a scope.

The small unmanned air vehicle repulsing apparatus 1 includes, on the mounting table 7, determination means 5 that determines, on the basis of information detected by the detection means 4, whether or not the drone is within a firing range as illustrated in FIG. 2. When the determination means 5 determines that the drone is within the firing range, the capturing body launching apparatus 3 launches the capturing body 2 at the drone.

The capturing body 2 includes a capturing bullet 20, a wire 21 and a distance sensor 24, as illustrated in FIGS. 1 and 2. The capturing bullet 20 captures the drone. The wire 21 is coupled to the capturing body 2. An electric reel 22 on the rotating table 8 takes up the wire 21. The distance sensor 24 detects the distance to the drone, thus identifying a position where the drone can be captured. A motor 23 is connected to the electric reel 22. The motor 23 is fastened to the rotating table 8 by a fastening bracket 23'. When the motor 23 starts, the electric reel 22 takes up the wire 21, thus allowing the capturing body 2 to be drawn close to the small unmanned air vehicle repulsing apparatus 1.

Figure 3:
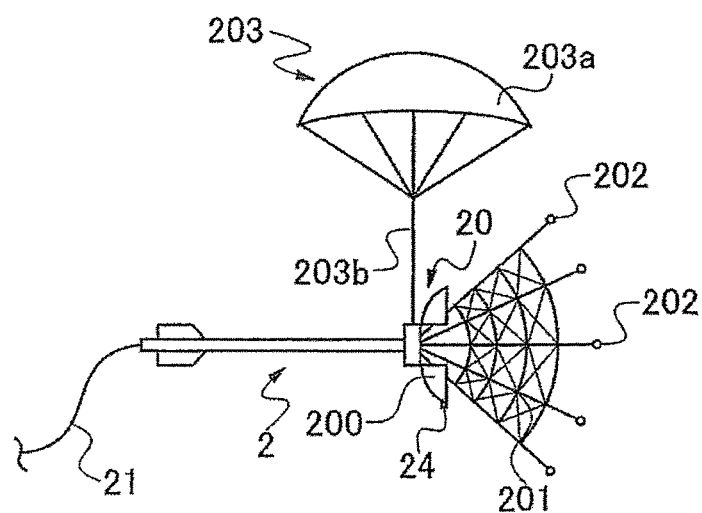
FIG. 3 is a side view illustrating a configuration of a capturing bullet of the capturing body.

The capturing bullet 20 includes a net 201, a plurality of weights 202, a container 200, and a parachute 203. The net 201 entangles the drone. The weights 202 are attached equidistantly to a rim portion of the net 201. The container 200 that can open and close accommodates the net 201 in a folded manner as illustrated in FIG. 3. The parachute 203 reduces a falling speed of the drone.

It is preferred that the net 201 should be made of a material that is strong to such an extent that the net 201 does not break when the drone is entangled in the net 201. In the meantime, the material of the weights 202 and the number thereof are not specifically limited. Attachment of the plurality of weights 202 to the rim portion of the net 201 makes it easier for the net 201 accommodated in the container 200 to unfold when the net 201 is released from the container 200 and prevents the drone from moving when the drone is entangled in the net 201.

Figure 4A:
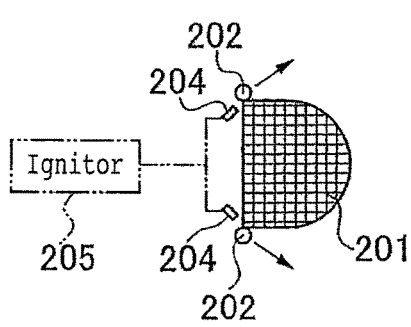
FIGS. 4A and 4B are explanatory diagrams describing a method by which a net of the capturing bullet is released.
Figure 4B:
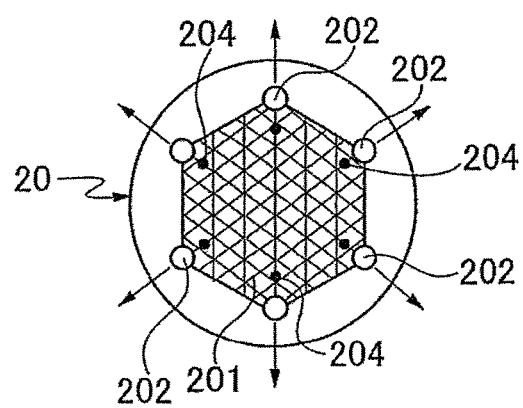

Here, the net 201 can be released from the container 200, for example, by using the principle of releasing an airbag. For example, an inflator (gas generator) is arranged behind the net 201 that makes up the capturing bullet 20. That is, as illustrated in FIG. 4A, a gas generator 204 is arranged behind each of the weights 202, and an ignitor 205 is arranged to detonate the gas generators 204. By igniting the ignitor 205 and detonating the gas generators 204, it is possible to release the net 201 from the container 200 by gas pressure. It is preferred that the gas generators 204 should be arranged as illustrated in FIG. 4B such that the weights 202 are blown off in directions that spread away from each other (radially). This allows for the net 201 to unfold positively in a radial manner and cover the drone. It should be noted that the ignitor and the gas generators are not specifically limited. However, it is preferred that they should be made from non-explosive compositions that are not subject to control under the Explosives Control Act.

The parachute 203 includes a semicircular umbrella body 203a and a sling 203b connected to the umbrella body 203a and coupled to the capturing body 2. Opening the umbrella body 203a with the drone captured with the capturing body 2 reduces the falling speed of the drone.

A description will be given next of an operation example of the small unmanned air vehicle repulsing apparatus 1. First, the capturing body 2 is fitted to the launch pad 30 of the capturing body launching apparatus 3 as illustrated in FIG. 2. Although not specifically limited, the small unmanned air vehicle repulsing apparatus 1 should preferably be provided mainly in a public area. The term "public area" does not refer to a specifically restricted area and includes, for example, the prime minister's official residence, Imperial Palace, Buddhist temples, parks, public facilities, historical architectures, and other areas.

A surrounding area of the small unmanned air vehicle repulsing apparatus 1 is detected by the detection means 4. The detection means 4 sends out radio waves into the air while at the same time being rotated by the rotating table 8 illustrated in FIG. 1. When the detection means 4 receives reflected waves reflected by a drone 6 illustrated in FIG. 5, for example, the detection means 4 can detect the distance and direction to the drone 6 from the small unmanned air vehicle repulsing apparatus 1, thus identifying the position of the drone 6. Next, the determination means 5 determines, on the basis of information detected by the detection means 4, whether or not the flying drone 6 is within the firing range. When the determination means 5 identifies the position of the drone 6 as within the firing range, the rear side of the launch pad 30 illustrated in FIG. 2 is rotated about the fulcrum shaft 10 at the support section 9, and the sight of the capturing body 2 fitted to the launch pad 30 is set at the position of the drone 6.

The capturing body launching apparatus 3 releases the hooking section 33, moving the bowstring 32 forward fast by the restoring force of the bow 31 that is hooked on the hooking section 33 by pulling the bowstring 32 backward. As a result, the capturing body 2 is launched at the drone 6. As the capturing body 2 is launched, the wire 21 coupled to the capturing body 2 is unwound from the electric reel 22.

Figure 5:
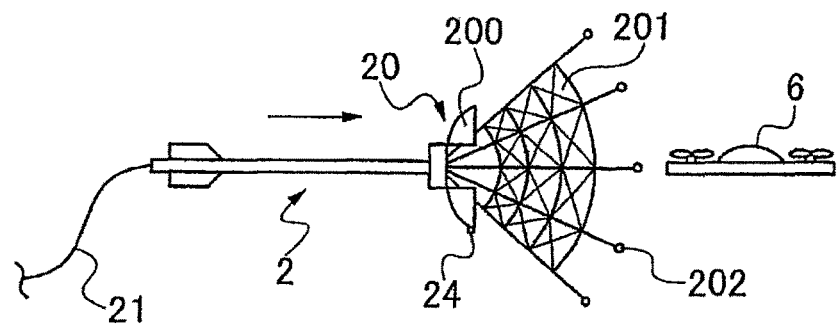
FIG. 5 is a side view illustrating a condition in which the capturing body is launched at a small unmanned air vehicle and the net of the capturing bullet is released.
Figure 5:

As illustrated in FIG. 5, when the capturing body 2 approaches the drone 6, and the distance sensor 24 identifies that the capturing body 2 has reached where the drone 6 can be captured with the capturing body 2, the container 200 of the capturing bullet 20 opens, releasing the net 201 forward. That is, ignition of the ignitor 205 illustrated in FIG. 4A detonates the gas generators 204, blowing off the weights 202 and unfolding the net 201 radially.

Figure 6:
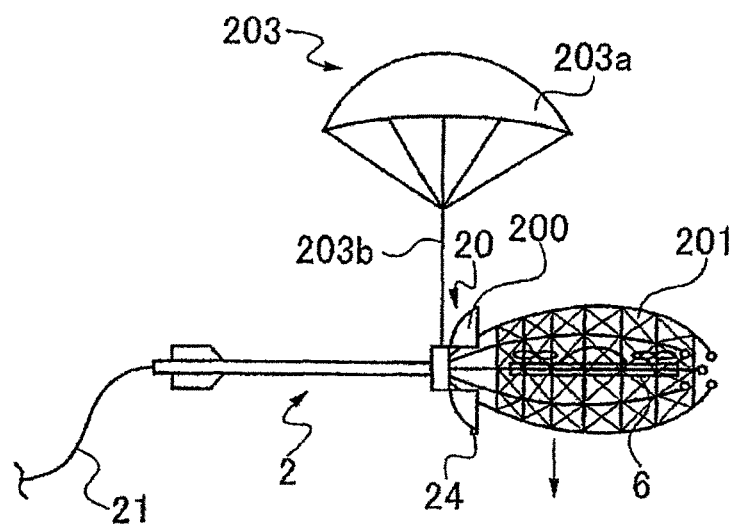
FIG. 6 is a side view illustrating a condition in which the small unmanned air vehicle is captured by the capturing body with a parachute being open.

When the net 201 covers and entangles the drone 6 as illustrated in FIG. 6, the drone 6 can no longer move, thus being captured. Then, the motor 23 illustrated in FIG. 2 starts, taking up the unwound wire 21 on the electric reel 22 and drawing the capturing body 2 that has captured the drone 6 close to the small unmanned air vehicle repulsing apparatus 1. At this time, the umbrella body 203a of the parachute 203 opens, reducing the falling speed of the drone 6 and preventing the drone 6 from colliding with the ground. Further, possible accidents can be proactively prevented if somebody is around where the drone 6 will fall.

Thus, the small unmanned air vehicle repulsing apparatus 1 according to the present invention includes the capturing body 2 and the capturing body launching apparatus 3. The capturing body 2 captures the drone 6. The capturing body launching apparatus 3 launches the capturing body 2 at the drone 6. As a result, the capturing body launching apparatus 3 can quickly capture the drone 6 by launching the capturing body 2 even if the drone 6 flies into a public area to be protected, thus protecting the interest and safety of law-abiding people.

The number of small unmanned air vehicle repulsing apparatuses 1 to be provided can be specified at will as necessary. Therefore, if the plurality of small unmanned air vehicle repulsing apparatuses 1 are provided in a public area, and if a plurality of suspicious drones fly into the public area, it is possible to capture these drones efficiently.

It should be noted that the capturing body 2 shown in the present embodiment should preferably be configured such that the capturing body 2 does not erroneously capture an object other than a drone (e.g., a bird). Identification means (e.g., thermal sensor) may be arranged in the capturing bullet 20.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. An unmanned air vehicle repulsing apparatus for repulsing an unmanned air vehicle, comprising:
    a single capturing body adapted to capture the unmanned air vehicle; the capturing body having a capturing bullet, a gas generator and a detonator,
    a net adapted to entangle the unmanned air vehicle,
    a parachute adapted to reduce a failing speed of the unmanned air vehicle, and
    a single wire coupled at one end to the capturing body; and
    a capturing body launching apparatus adapted to launch the capturing body at the unmanned air vehicle and retrieve the unmanned air vehicle; the capturing body launching apparatus have an electric reel on the capturing body launch apparatus, another end of the wire being secured to the electric reel;
    a radar device adapted to detect a distance to and a direction of the unmanned air vehicle,
    wherein the radar device is adapted to determine whether or not the unmanned air vehicle is within a firing range, and
    when the unmanned air vehicle is within the firing range, the capturing body launching apparatus launches the capturing body at the unmanned air vehicle.

* * * * *